United States Patent
Caldwell et al.

(10) Patent No.: US 6,774,353 B2
(45) Date of Patent: Aug. 10, 2004

(54) RADIAL POWER FEEDBACK SENSOR FOR FIBER OPTIC BUNDLE

(75) Inventors: Scott Caldwell, Fairport, NY (US); Robert McNair, Rochester, NY (US)

(73) Assignee: Branson Ultrasonics Corporation, Danbury, CT (US)

( * ) Notice: Subject to any disclaimer, the term of this patent is extended or adjusted under 35 U.S.C. 154(b) by 0 days.

(21) Appl. No.: 10/323,153

(22) Filed: Dec. 18, 2002

(65) Prior Publication Data

US 2004/0118996 A1 Jun. 24, 2004

(51) Int. Cl.[7] .................................................. G01J 1/04
(52) U.S. Cl. ....................... 250/227.11; 385/12; 385/54
(58) Field of Search .......................... 250/227.11, 205; 219/121.6, 121.61; 385/12–13, 54–55, 89

(56) References Cited

U.S. PATENT DOCUMENTS 4,653,845 A  *  3/1987  Tremblay et al. ............. 385/46
5,093,879 A  *  3/1992  Bregman et al. ............. 385/93
6,491,447 B2  *  12/2002  Aihara ......................... 385/92

* cited by examiner

*Primary Examiner*—David Porta
*Assistant Examiner*—Patrick J. Lee
(74) *Attorney, Agent, or Firm*—Harness, Dickey & Pierce, P.L.C.

(57) ABSTRACT

A radial power feedback sensor senses the power output of a fiber optic bundle. The fiber optic bundle is arranged generally radially about an axis to carry radiative energy produced by a laser. A spacer is positioned within the fiber optic bundle such that the fiber optic bundle generally surrounds the spacer. The spacer serves to enable the radiative energy to pass therethrough. A photo detector is then disposed adjacent the spacer and is operable to output a signal in response to a measured intensity of the radiative energy passing through the spacer. Accordingly, due to the surrounding of the fiber optic bundle around the photo detector, a greater number of individual photo optic lines are exposed to the photo detector, thereby decreasing the variance between the measure output and the true output of the laser.

22 Claims, 2 Drawing Sheets

RADIAL POWER FEEDBACK SENSOR FOR FIBER OPTIC BUNDLE

FIELD OF THE INVENTION

The present invention relates generally to welding and, more particularly, relates to an improved apparatus for measuring the power output of a laser beam.

BACKGROUND OF THE INVENTION

Laser welding is commonly used to join plastic or resinous parts, such as automobile thermoplastic parts, at a welding zone. An example of such use of lasers can be found in U.S. Pat. No. 4,636,609, which is expressly incorporated herein by reference.

As is well known, lasers provide a focused beam of electromagnetic radiation at a specified frequency (i.e., coherent monochromatic radiation). There are a number of types of lasers available; however, infrared lasers or non-coherent sources provide a relatively economical source of radiative energy for use in heating a welding zone. One particular example of infrared welding is known as Through-Transmission Infrared Welding (TTIR). TTIR welding employs an infrared laser capable of producing infrared radiation that is directed by fiber optics, waveguides, or light guides through a first plastic part and into a second plastic part. This first plastic part is often referred to as the transmissive piece, since it generally permits the laser beam from the laser to pass therethrough. However, the second plastic part is often referred to as absorptive piece, since this piece generally absorbs the radiative energy of the laser beam to produce heat in the welding zone. This heat in the welding zone causes the transmissive piece and the absorptive piece to be melted and thus welded together.

It is often important to have precise feedback information relating to laser intensity so as to adjust or at least measure the laser output during the welding process. This information must reliably indicate the true intensity of the laser beam to provide sufficient information to a controller or worker. However, because the entire weld zone is illuminated simultaneously in a TTIR plunge weld, it is impractical to use a conventional beam splitter to measure the laser intensity at the weld surface after exiting the fiber optic bundle. Additionally, because there are unpredictable coupling losses between the laser diode and the fiber optic bundle, it is unrepresentative and thus unreliable to measure the output light of the laser diode before it enters the fiber optic bundle. Therefore, any reliable sampling of the laser beam must be done while the laser beam passes through the fiber optic bundle.

Unfortunately, the distribution of laser light from the laser diode is not uniform. Therefore, inherently there is variation of the intensity of light in each individual optical fiber. Hence, the light intensity in a single individual optical fiber is not representative of the light intensity in the entire fiber optic bundle. Ideally, the desired feedback information provided by any sensor would be of the total population of fibers in a bundle, which would eliminate the variance that exists between individual fibers. Statistically, the larger the population of fibers sampled, the smaller the random variance is between the feedback signal (i.e. measure output) and the true power output. With reference to FIG. 4, the statistical relationship between the sample population and the variance between the measure output and the true output for a laser beam input whose uniformity varies by 50% is shown.

Past attempts to feed back a small percentage of the population of fibers to a photodiode were unsuccessful in part because the variance between the measure output and the true output power was too high. On the other hand, attempts to feed back a large percentage of the fibers yielded smaller variances, but consumed too much energy that could otherwise be used for welding.

Accordingly, there exists a need in the relevant art to provide an apparatus that is capable of minimizing the variance between the measure power output and the true power output of a laser. Furthermore, there exists a need in the relevant art to provide an apparatus that is capable of minimizing the variance between the measured power output and the true power output of a laser without consuming energy that could otherwise be used for welding. Still further, there exists a need in the relevant art to provide an apparatus and method of using the same that is capable of overcoming the disadvantages of the prior art.

SUMMARY OF THE INVENTION

According to the principles of the present invention, a radial power feedback sensor is provided that reliably and accurately senses the power output of a fiber optic bundle. The fiber optic bundle is arranged generally radially about an axis to carry radiative energy produced by a laser. A spacer is positioned within the fiber optic bundle such that the fiber optic bundle generally surrounds the spacer. The spacer serves to enable the radiative energy to pass therethrough. A photo detector is then disposed adjacent the spacer and is operable to output a signal in response to a measured intensity of the radiative energy passing through the spacer. Accordingly, due to the surrounding of the fiber optic bundle around the photo detector, a greater number of individual photo optic lines are exposed to the photo detector, thereby decreasing the variance between the measure output and the true output of the laser.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
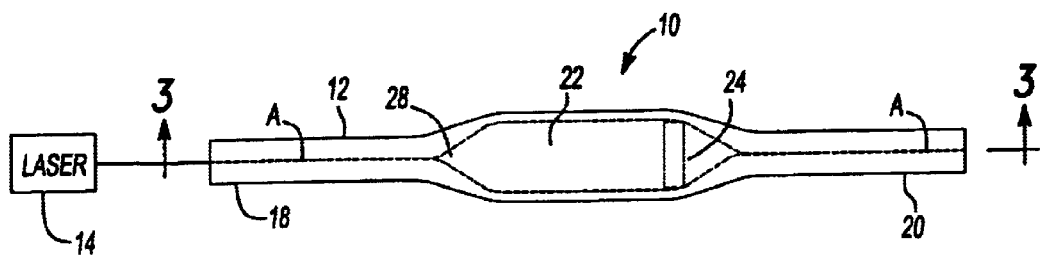
FIG. 1 is a side view illustrating a radial power feedback sensor according to the principles of the present invention-being disposed within a fiber optic bundle.

The following description of the preferred embodiment is merely exemplary in nature and is in no way intended to limit the invention, its application, or uses.

Referring to the drawings, a radial power feedback sensor 10 is provided according to the principles of the present invention. Radial power feedback sensor 10 is disposed within a fiber optic bundle 12 to measures the laser output intensity of an infrared laser 14. More particularly, with reference to FIGS. 1 and 2, fiber optic bundle 12 is coupled to infrared laser 14 to transmit radiative energy therethrough. It should be appreciated that the principles of the present invention are not limited to the use of an infrared laser. The advantages of the present invention may be achieved with any one of a number of conventional laser devices.

Fiber optic bundle 12 includes a plurality of generally hollow, individual optical fibers 16 disposed in a generally radial orientation about an axis A. Each of the plurality of individual optical fibers 16 is capable of transmitting at least a portion of a laser beam output from infrared laser 14 from a first end 18 to a second end 20 in a conventional manner. Each of the plurality of individual optical fibers 16 is flexible in construction.

Figure 2:
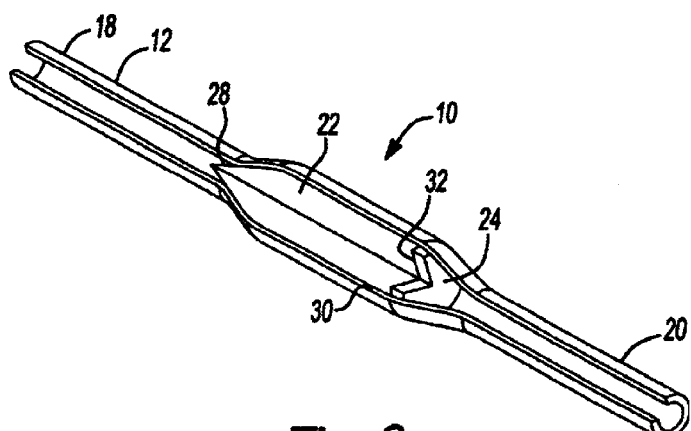
FIG. 2 is a perspective view of the radial power feedback sensor and fiber optic bundle, with portions removed for clarity.
Figure 3:
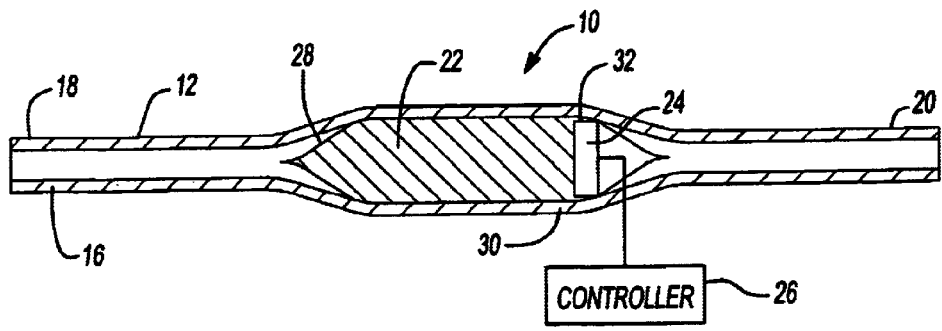
FIG. 3 is a cross section view taken along line 3—3 of FIG. 1.
Figure 4:
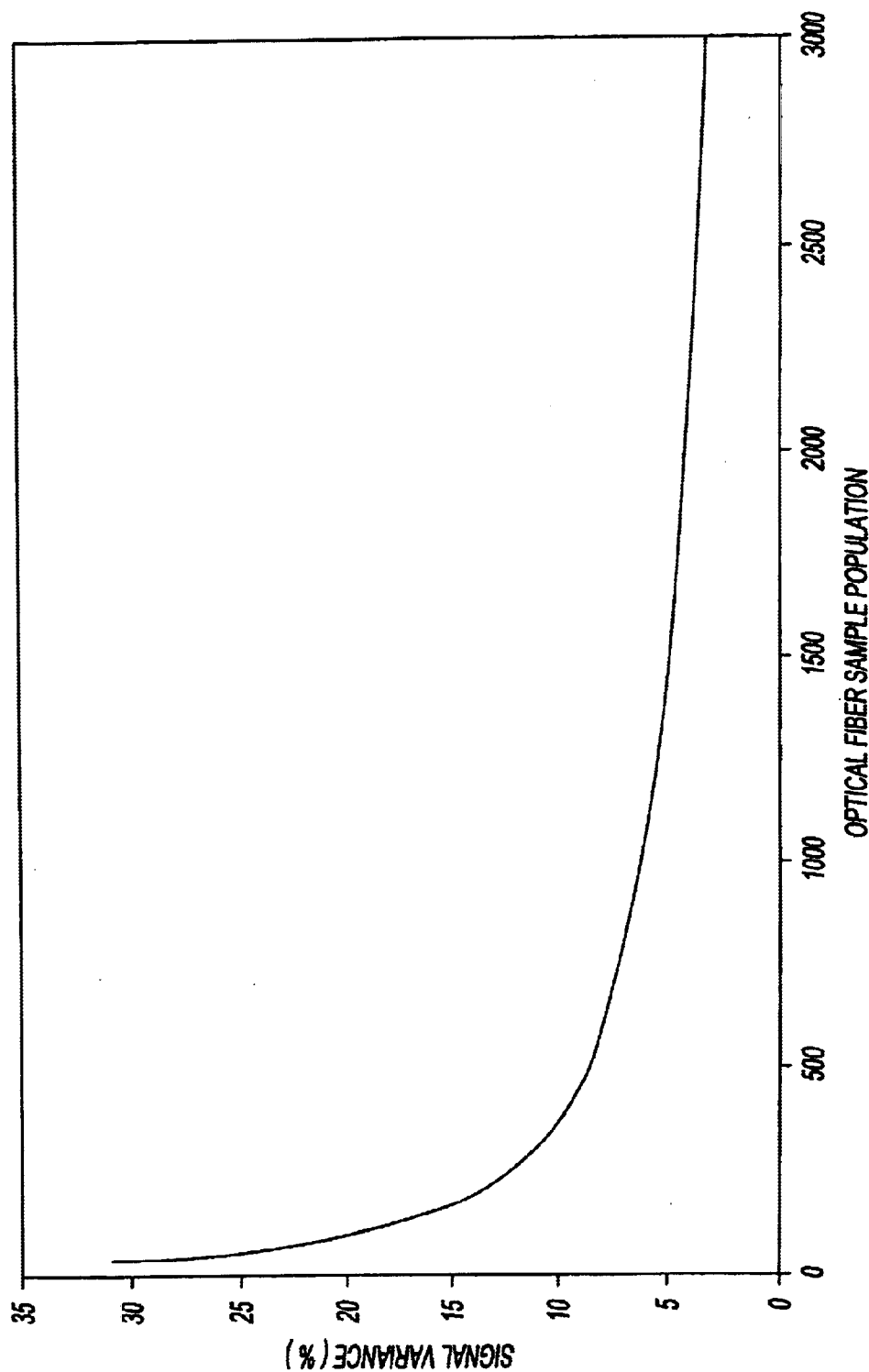
FIG. 4 is a graph illustrating the statistical variance between sensor power signal and true optical fiber bundle output power for an input variability of 50%.

As best seen in FIGS. 1–3, radial power feedback sensor 10 preferably includes a spacer 22 and a photo detector 24. Spacer 22 is preferably made of a clear or translucent material and is cylindrically shaped to lay within a core of the plurality of individual optical fibers 16 of fiber optic bundle 12. Spacer 22 holds each of the plurality of individual optical fibers 16 evenly spread about axis A of fiber optic bundle 12 in such a way that a high population of individual optical fibers 16 is equally visible from the inside of spacer 22. At one end of spacer 22, along axis A of fiber optic bundle 12, lays photo detector 24. Photo detector 24 measures the high angle light escaping from the cladding of individual optical fibers 16 and outputs a signal to a device 26, such as a controller, computer, readout display, or the like. Because a high population of individual optical fibers 16 is sensed by photo detector 24, the variation between the output measured by photo detector 24 and the true power output at second end 20 of fiber optic bundle 12 is low.

As shown in FIGS. 1–3, spacer 22 is preferably tapered at a first end 28 to enable to smooth deflection of the plurality of individual optical fibers 16 around spacer 22 and photo detector 24. Additionally, spacer 22 preferably further includes a tailored contour at a second end 30 to accommodate photo detector 24. In the present embodiment, photo detector 24 is shown disposed in a receiving bore 32 formed in second end 30 of spacer 22, which closely conforms to the shape of photo detector 24 to accurately and reliably retain photo detector 24 therein, such as a press fit connection. However, it should be appreciated that any shape second end 30 may be used that is conducive to retaining or at least interfacing with photo detector 24 to facilitate the operation of photo detector 24. For example, second end 30 may be a contoured shape that aids in focusing light energy upon photo detector 24.

Spacer 22 is preferably made of a clear material transmissive to the given light to be detected, such as polycarbonate, plastic, glass, and the like. Clear plastic is due to its general availability and low cost. It should be understood that spacer 22 may be either clear or translucent, although clear is preferable because a larger proportion of light can be detected. Spacer 22 may also be either solid or hollow. Although, for the present embodiment, spacer 22 is solid to simplify the affixing of photo detector 24.

Photo detector 24 can be any type of photo detector that is capable of outputting a variable signal in response to a measured light intensity. For example, photo detector 24 may be a photodiode, a phototransistor, a photocell, or the like. However, a photodiode is most preferred because of its overall signal responsiveness. Radial power feedback sensor 10 can use any combination of spacer 22 and photo detector 24 that presents a high population of individual optical fiber lines 16 from fiber optic bundle 12 in an equal manner to photo detector 24.

Still referring to FIGS. 1–3, the plurality of individual optical fibers 16 are shown being radially disposed about and generally parallel to axis A. However, it should be understood that the plurality of individual optical fibers 16 may be oriented in other directions relative to spacer 22 and/or photo detector 24, such as perpendicular to axis A, so as to facilitate the measuring of high angle light escaping from the cladding of each of the plurality of individual optical fibers 16.

It should be understood that as the plurality of individual optical fibers 16 are disposed about radial power feedback sensor 10, each of the plurality of individual optical fibers 16 needs only occupy a small segment of the complete circle about spacer 22 and photo detector 24 in order to be detected evenly by photo detector 24. However, it is preferable to dispose individual optical fibers 16 entirely about spacer 22 to maximize the detection area for any given geometry.

According to the principles of the present invention, radial power feedback sensor 10 is capable of measuring the total optical power being transmitted by fiber optic bundle 12 without causing any additional power loss in fiber optic bundle 12. This arrangement of having a spacer 22 and photo detector 24 disposed within fiber optic bundle 12 enables a higher population of individual optical fibers 16 to be sensed by photo detector 24. Because of the high number of individual optical fibers 16 being sensed by photo detector 24, the variance between the measure power output of laser 14 and the true power output is much lower than conventional methods. Additionally, because the power output is detected within fiber optic bundle 12 itself, additional space for a feedback detector at the end of fiber optic bundle 12 no longer is required. This enables more tooling flexibility in TTIR plunge welding systems. Radial power feedback sensor 10 provides superior detection accuracy in a superior sensing location. By way of non-limiting example, it has been determined that the present invention is able to achieve a 4.5% variance using a ½" radial power feedback sensor with 1600 visible optic fibers out of 8600 total optic fibers.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A sensor for sensing power output of a fiber optic bundle, said fiber optic bundle being arranged generally radially about an axis to carry radiative energy, said sensor comprising:

a spacer being positionable within the fiber optic bundle such that the fiber optic bundle generally surrounds said spacer, said spacer being operable to enable the radiative energy to pass therethrough; and a photo detector disposed adjacent said spacer, said photo detector operable to output a signal in response to a measured intensity of the radiative energy passing through said spacer.

2. The sensor according to claim 1 wherein said spacer is positionable generally coaxially on the axis of the fiber optic bundle.

3. The sensor according to claim 1 wherein said spacer includes a first end and a second end, said first end being generally tapered to permit the smooth transition of the fiber optic bundle around said spacer.

4. The sensor according to claim 3 wherein said second end comprises a receiving bore, said receiving bore being sized to receive said photo detector therein.

5. The sensor according to claim 4 wherein said receiving bore is sized to define a press fit with said photo detector.

6. The sensor according to claim 1, further comprising:
a controller operably coupled to said photo detector, said controller receiving said signal from said photo detector.

7. The sensor according to claim 1 wherein said photo detector is chosen from the group consisting essentially of a photodiode, a phototransistor, and a photocell.

8. The sensor according to claim 1 wherein said spacer is made of a material chosen from the group consisting essentially of plastic, glass, and polycarbonate.

9. A sensor assembly comprising:
a fiber optic bundle having a plurality of individual optical fibers being arranged generally radially about an axis, said fiber optic bundle being operable to carry radiative energy therethrough;
a spacer being disposed within said fiber optic bundle such that said plurality of individual optical fibers generally surrounds said spacer, said spacer being operable to enable said radiative energy to pass therethrough; and
a photo detector disposed adjacent said spacer, said photo detector operable to output a signal in response to a measured intensity of said radiative energy passing through said spacer.

10. The sensor assembly according to claim 9 wherein said spacer is disposed generally coaxially on said axis of said fiber optic bundle.

11. The sensor assembly according to claim 9 wherein said spacer includes a first end and a second end, said first end being generally tapered to, permit the smooth transition of said plurality of individual optical fibers around said spacer.

12. The sensor assembly according to claim 11 wherein said second end comprises a receiving bore, said receiving bore being sized to receive said photo detector therein.

13. The sensor assembly according to claim 12 wherein said receiving bore is sized to define a press fit with said photo detector.

14. The sensor assembly according to claim 9, further comprising:
a controller operably coupled to said photo detector, said controller receiving said signal from said photo detector.

15. The sensor assembly according to claim 9 wherein said photo detector is chosen from the group consisting essentially of a photodiode, a phototransistor, and a photocell.

16. The sensor assembly according to claim 9 wherein said spacer is made of a material chosen from the group consisting essentially of plastic, glass, and polycarbonate.

17. A laser assembly comprising:
a laser outputting radiative energy;
a fiber optic bundle having a plurality of individual optical fibers being arranged generally radially about an axis, said fiber optic bundle being coupled to said laser to carry said radiative energy therethrough;
a spacer being disposed within said fiber optic bundle such that said plurality of individual optical fibers generally surrounds said spacer, said spacer being operable to enable said radiative energy to pass therethrough;
a photo detector disposed adjacent said spacer, said photo detector operable to output a signal in response to a measured intensity of said radiative energy passing through said spacer to determine an output level of said laser; and
a controller operably coupled to said photo detector, said controller receiving said signal from said photo detector.

18. The laser assembly according to claim 17 wherein said spacer is disposed generally coaxially on said axis of said fiber optic bundle.

19. The laser assembly according to claim 17 wherein said spacer includes a first end and a second end, said first end being generally tapered to permit the smooth transition of said plurality of individual optical fibers around said spacer.

20. The laser assembly according to claim 19 wherein said second end comprises a receiving bore, said receiving bore being sized to receive said photo detector therein.

21. The laser assembly according to claim 17 wherein said photo detector is chosen from the group consisting essentially of a photodiode, a phototransistor, and a photocell.

22. The laser assembly according to claim 17 wherein said spacer is made of a material chosen from the group consisting essentially of plastic, glass, and polycarbonate.

* * * * *